United States Patent
Liao

(10) Patent No.: US 8,280,757 B2
(45) Date of Patent: Oct. 2, 2012

(54) DEMAND FORECAST SYSTEM AND METHOD

(75) Inventor: Yuan-Fu Liao, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 1626 days.

(21) Appl. No.: 11/051,424

(22) Filed: Feb. 4, 2005

(65) Prior Publication Data

US 2006/0178927 A1   Aug. 10, 2006

(51) Int. Cl.
*G06Q 10/00* (2012.01)

(52) U.S. Cl. .............. 705/7.31; 705/7.37; 705/7.29; 705/7.36

(58) Field of Classification Search .......... 705/7.31, 705/7.37, 7.36, 7.29
See application file for complete search history.

(56) References Cited

U.S. PATENT DOCUMENTS

| | | | |
|---|---|---|---|
| 5,712,985 A * | 1/1998 | Lee et al. | 705/7 |
| 7,155,510 B1 * | 12/2006 | Kaplan | 709/224 |
| 7,587,330 B1 * | 9/2009 | Shan | 705/10 |
| 2002/0049687 A1 * | 4/2002 | Helsper et al. | 706/45 |
| 2002/0169657 A1 | 11/2002 | Singh et al. | |
| 2003/0074251 A1 * | 4/2003 | Kumar et al. | 705/10 |

FOREIGN PATENT DOCUMENTS

TW    581955    4/2004

OTHER PUBLICATIONS

Chiou et al., "Grey Prediction GM (1,1) Model for Forecasting Demand of Planned Spare Parts in Navy of Taiwan" pp. 1-7, Aug. 6, 2004.*

Taiwan Office Action issued May 24, 2006.

* cited by examiner

*Primary Examiner* — Beth V Boswell
*Assistant Examiner* — Adrian McPhillip
(74) *Attorney, Agent, or Firm* — Thomas|Kayden

(57) ABSTRACT

A demand forecast system and method. A planning module normalizes historical forecast data, and generates a forecast error interval according to the historical forecast data and a Grey forecast model. An adjustment module adjusts a target forecast value of a target-planning bucket according to the forecast error interval and/or the distance between the forecast error interval and a benchmark.

7 Claims, 5 Drawing Sheets

DEMAND FORECAST SYSTEM AND METHOD

BACKGROUND

The present disclosure relates generally to supply chain management, and, more particularly, to a demand forecast system and method with an adjustment mechanism based on a Grey forecast model.

In product supply, a supply chain supports material purchase, fabrication of materials into intermediate and finished products, and distribution of finished products to clients. Supply chain management has become important in meeting goals of reduced inventory, increased productivity, and enhanced competitiveness. Manufacturing and distribution facilities have limited resources and capacity, however, so not every client request may be met. For example, some requests may be promised but unfulfilled, some clients may experience inadequate supply, and other requests may be rejected. Consequently, effective capacity management in supply chain management, without excess capacity loss, has become important for product suppliers requiring control of manufacture or distribution.

In the supply chain, clients transmit demands to a supplier. The demand may include a request for a particular quantity of a device by a specific date. The supplier forecasts and plans its internal or external manufacturing schedule according to these received demands, and allocates capacity for product manufacture to satisfy each client. After receiving orders corresponding to demands from clients, the supplier begins manufacture of the products. It is understood that the supplier must invest capital to prepare related equipment and materials according to the demand forecast in advance. If the demand forecast is not close enough to the actual orders, the supplier will suffer significant losses.

Conventionally, the sales demand is forecast based on a regression or time series model. The regression model assumes the relationship between variables is linear. Actual orders, however, rarely present a clear trend because of uncertain market demand. The time series model requires a large number of experimental samples (always more than 50 or more). Additionally, the forecast result of the regression or time series model is an experimental simple forecast value with lack of flexibility, and thus, is not practical for use in a facility with various product types having unpredictable market lifetimes and limited historical forecast data, such as an upper stream and down stream factories in semiconductor industry.

SUMMARY

An embodiment of the invention is applicable among others to any manufacturer, service supplier, and/or product type.

An embodiment of the invention provides a demand forecast system and method.

The demand forecast system according to an embodiment of the invention includes a planning module and an adjustment module. The planning module provides a forecast error interval mechanism to generate a forecast error interval according to historical forecast data and a Grey forecast model. The adjustment module adjusts a target forecast value of a target-planning bucket according to the forecast error interval.

The planning module further normalizes the historical forecast data. The historical forecast data corresponds to a specific planning bucket, or a sequence of planning buckets. If the historical forecast data corresponds to a specific planning bucket, the planning module normalizes the historical forecast data based on the actual order of the specific planning bucket.

The planning module further uses two forecast values generated according to the historical forecast data and the Grey forecast model, to generate the forecast error interval. The Grey forecast model is GM(1,1) model based on Grey forecast theory.

The adjustment module further adjusts the target forecast value according to the distance between the forecast error interval and a predetermined benchmark.

A demand forecast method according to an embodiment of the invention is also provided. First, a forecast error interval is generated according to historical forecast data and a Grey forecast model. Then, a target forecast value of a target-planning bucket is adjusted according to the forecast error interval.

The historical forecast data is further normalized. The historical forecast data corresponds to a specific planning bucket, or a sequence of planning buckets. If the historical forecast data corresponds to a specific planning bucket, the historical forecast data is normalized based on the actual order of the specific planning bucket.

The forecast error interval is generated using two forecast values generated according to the historical forecast data and the Grey forecast model. The Grey forecast model is GM(1,1) model based on Grey forecast theory.

The target forecast value is further adjusted according to the distance between the forecast error interval and a predetermined benchmark.

The above-mentioned method may take the form of program code embodied in a tangible media. When the program code is loaded into and executed by a machine, the machine becomes an apparatus for practicing the disclosed method.

BRIEF DESCRIPTION OF THE DRAWINGS

The aforementioned objects, features and advantages will become apparent by referring to the following detailed description with reference to the accompanying drawings, wherein.

DESCRIPTION

Figure 1:
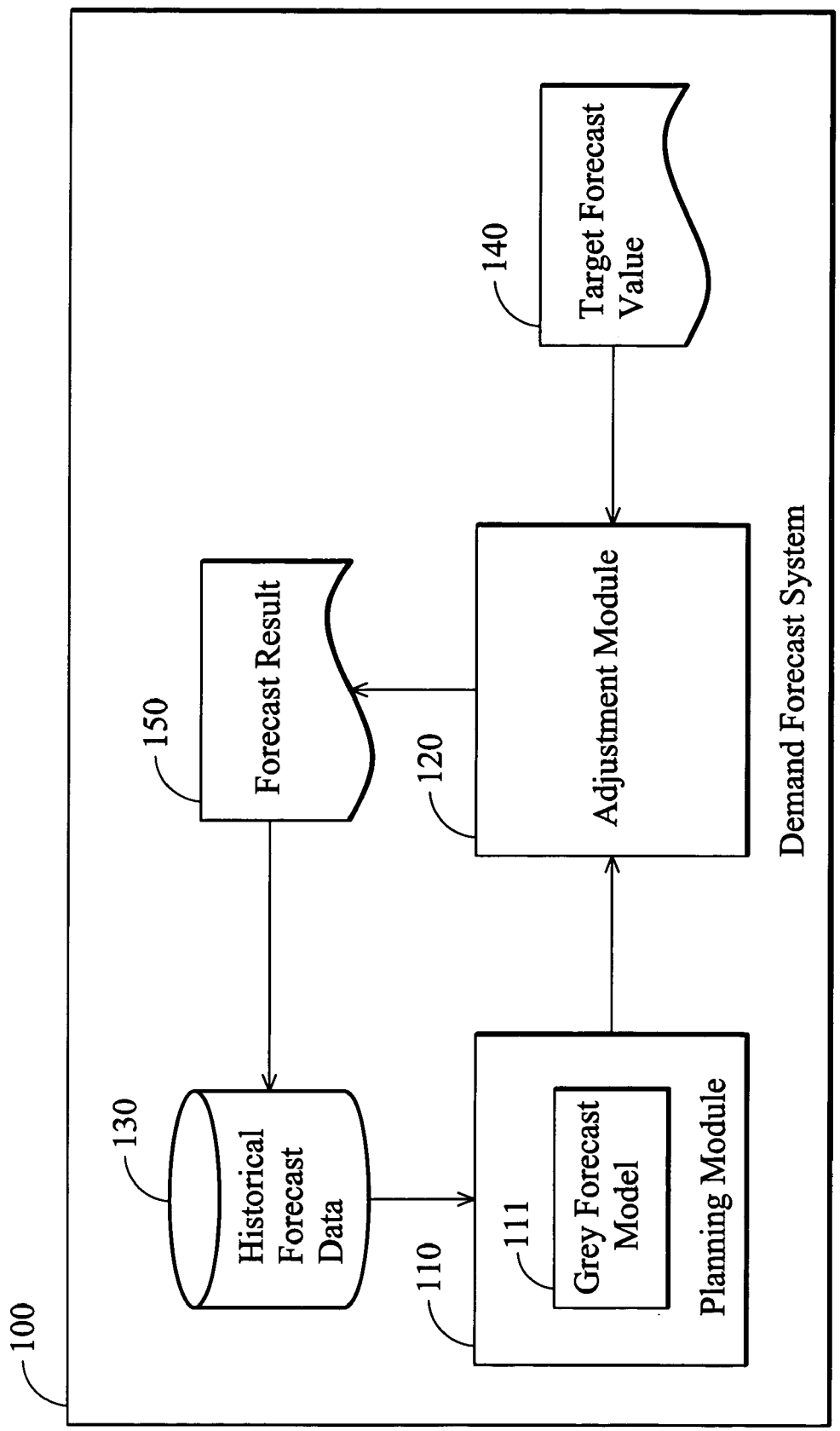
FIG. 1 is a schematic diagram illustrating the architecture of the demand forecast system according to an embodiment of the invention.

FIG. 1 is a schematic diagram illustrating the architecture of the demand forecast system according to an embodiment of the invention.

The demand forecast system 100 includes a planning module 110 and an adjustment module 120. The planning module 110 provides a forecast error interval mechanism to generate a forecast error interval according to historical forecast data 130 and a Grey forecast model 111. The planning module 110 may first normalize the required historical forecast data 130.

The purpose of normalization is to standardize the historical forecast data 130 under a specific baseline. The required historical forecast data 130 may correspond to a specific planning bucket, or a sequence of planning buckets. For example, a plurality of data sets for planning bucket January, or a plurality of data sets corresponding to planning buckets January, February, March, and April can be used to generate the forecast error interval via the mechanism. If the historical forecast data 130 corresponds to a sequence of planning buckets, the planning module 110 can normalize the historical forecast data 130 based on the average actual order of these planning buckets, the actual order of the last planning bucket, or other values. If the historical forecast data 130 corresponds to a specific planning bucket, the planning module 110 can normalize the historical forecast data 130 based on the actual order of the specific planning bucket.

Table 1 shows an example of the raw data of the historical forecast data 130.

TABLE 1

| Planning bucket | 2003/January | 2003/February |
|---|---|---|
| Historical Forecast Data (1) | 1200 | 1300 |
| Historical Forecast Data (2) | 1100 | 1400 |
| Historical Forecast Data (3) | 1000 | 800 |
| Historical Forecast Data (4) | 1200 | 700 |
| Historical Forecast Data (5) | 1300 | 1000 |
| Historical Forecast Data (6) | 1050 | 900 |
| Actual Order | 1100 | 900 |

The historical forecast data 130 for planning bucket January are 1200, 1100, 1000, 1200, 1300, and 1050, and for planning bucket February 1300, 1400, 800, 700, 1000, and 900. The historical forecast data 130 for January and February can be respectively normalized based on the corresponding actual orders 1100 and 900. The normalized historical forecast data 130 is shown in Table 2.

TABLE 2

| Planning bucket | 2003/January | 2003/February |
|---|---|---|
| Historical Forecast Data (1) | 1.0909 | 1.4444 |
| Historical Forecast Data (2) | 1.0000 | 1.5556 |
| Historical Forecast Data (3) | 0.9091 | 0.8889 |
| Historical Forecast Data (4) | 1.0909 | 0.7778 |
| Historical Forecast Data (5) | 1.1818 | 1.1111 |
| Historical Forecast Data (6) | 0.9545 | 1.0000 |
| Actual Order | 1.0000 | 1.0000 |

The Grey forecast model 111 can be GM(1,1) model based on Grey forecast theory. Grey forecast theory was proposed by Dr. Deng in 1982 mainly focusing on uncertainly and limited incident cases. Grey forecast model could forecast non-linear behavior, requiring only four samples. It is understood that the forecast accuracy can be improved using more samples.

The normalized historical forecast data 130 can be the input of the Grey forecast model 111, and two forecast values can thus be generated accordingly. The planning module 110 uses the forecast values to generate the forecast error interval.

The adjustment module 120 receives a target forecast value 140 of a target-planning bucket, and adjusts the target forecast value 140 according to the forecast error interval mechanism and/or the distance between the forecast error interval and a predetermined benchmark. It is understood that the benchmark may be the normalized value of the actual order, such as 100.00%. The forecast result 150 (adjusted target forecast value) generated by the adjustment module 120 can forecast subsequent demand/sales. It is understood that the target-planning bucket may be any one of the planning buckets. As an example, to remove seasonal variation, the specific and target planning buckets may be buckets for the same calendar month in different years.

Figure 2:
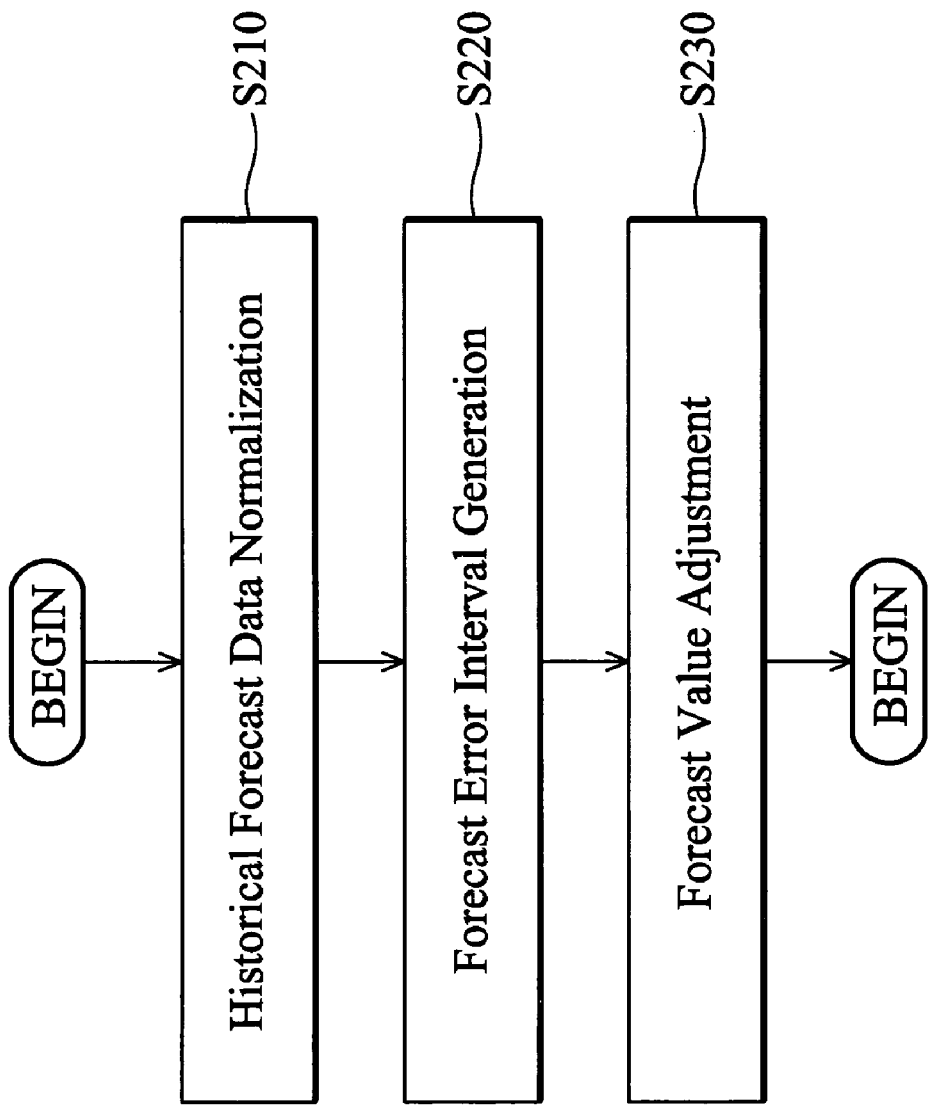
FIG. 2 is a flowchart showing the demand forecast method according to an embodiment of the invention.

FIG. 2 is a flowchart showing the demand forecast method according to an embodiment of the invention.

In step S210, historical forecast data is first normalized. As describe above, the historical forecast data may correspond to a specific planning bucket, or a sequence of planning buckets. If the historical forecast data corresponds to a sequence of planning buckets, the historical forecast data can be normalized based on the average actual order of these planning buckets, the actual order of the last planning bucket, or other values. If the historical forecast data corresponds to a specific planning bucket, the historical forecast data can be normalized based on an actual order of the specific planning bucket.

In step S220, a forecast error interval is generated according to the historical forecast data and a Grey forecast model. In this embodiment, GM(1,1) model based on Grey forecast theory is employed. First, the normalized historical forecast data is input to the Grey forecast model $$\left(\frac{dX_{(1)}}{dt} + aX_{(1)} = b\right),$$

to obtain two Grey forecast parameters (a and b), which can be used to obtain two forecast values. The forecast values generate the forecast error interval.

In the example of table 2, using 6 historical forecast data of 2003/January, the Grey forecast parameters are:

$$a = \frac{\left(\sum_{i=2}^{6} Z_{(1)} \times \sum_{i=2}^{6} X_{(1)}\right) - \left(5 \times \sum_{i=2}^{6} X_{(1)} Z_{(1)}\right)}{5 \times \sum_{i=2}^{6} (Z_{(1)}^2) - \left(\sum_{i=2}^{6} Z_{(1)}\right)^2} = -0.0171, \text{ and}$$

$$b = \frac{\sum_{i=2}^{6} X_{(1)} \times \left(\sum_{i=2}^{6} Z_{(1)}\right)^2 - \left(\sum_{i=2}^{6} Z_{(1)} \times \sum_{i=2}^{6} X_{(1)} Z_{(1)}\right)}{5 \times \sum_{i=2}^{6} (Z_{(1)}^2) - \left(\sum_{i=2}^{6} Z_{(i)}\right)^2} = 0.9654, \text{ in}$$

which $X_{(0)}$ is the original series of historical forecast data ($X_{(0)}(1) \sim X_{(0)}(6)$), $X_{(1)}$ is the AGO (accumulated generating operation) series, and $Z_{(1)}$ is the average series. It is understood that Grey forecast theory is well known, and its detail is thus omitted here. Then, the forecast values ($X_{(0)}(7)$) are:

$$X_{(0)}(7) = \frac{b - \left(\frac{1 - 0.5a}{1 + 0.5a}\right) \times X_{(0)}^{(1)}}{1 + 0.5a} \times \left(\frac{1 - 0.5a}{1 + 0.5a}\right)^5$$

$$= 1.0810$$

$$= 108.10\%,$$

and

-continued $$X_{(0)}(7) = \left\{\left[X_{(0)}^{(1)} - \frac{b}{a}\right] \times \exp(-6a)\right\} + \frac{b}{a} - X_{(1)}^{(7)}$$
$$= 1.0809$$
$$= 108.09\%.$$

Figure 3:
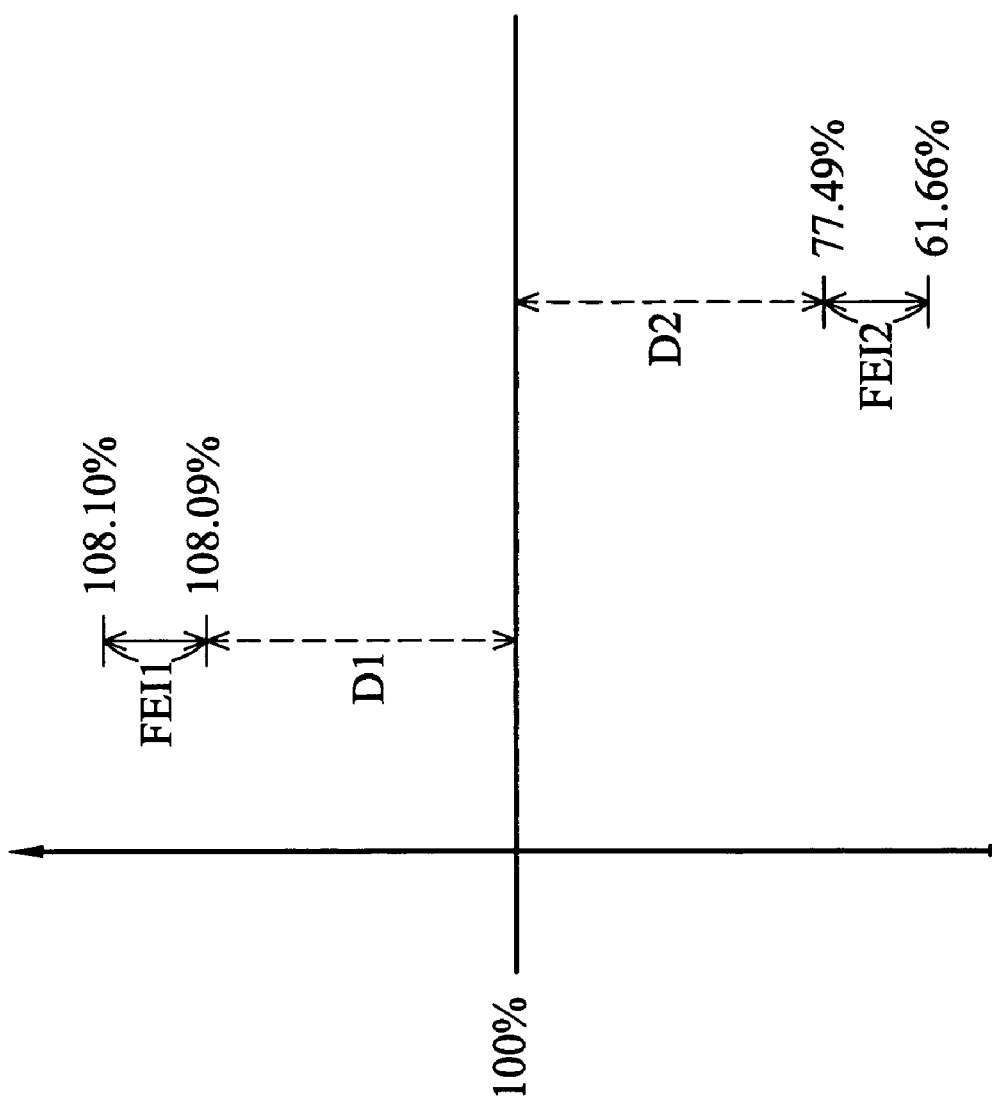
FIG. 3 is a schematic diagram illustrating the forecast error interval corresponding to the planning buckets 2003/January and 2003/February.

Similarly, using 6 historical forecast data of 2003/February, the two forecast values are 61.66% and 77.49%, respectively. FIG. 3 is a schematic diagram illustrating the forecast error interval corresponding to the planning buckets 2003/January and 2003/February. As shown in FIG. 3, the forecast error interval FEI1 of 2003/January is between 108.10% and 108.09%, and the distance D1 to the benchmark (100%) is 8.09%. The forecast error interval FEI2 of 2003/February is between 77.49% and 61.66%, and distance D2 to the benchmark (100%) is 22.51%.

Then, in step S230, a target forecast value of a target-planning bucket is adjusted according to the forecast error interval and the distance between the forecast error interval and a benchmark (such as 100.00%), representing the market trend of the forecasted product. If the forecast error interval is above the benchmark, the target forecast value is adjusted according to the equation:

$$ATFV=TFV \times (1-(s1 \times FEI)) \times (1-(s2 \times D)) \qquad (1),$$

and if the forecast error interval is under the benchmark, the target forecast value is adjusted according to the equation:

$$ATFV=TFV \times (1+(s1 \times FEI)) \times (1+(s2 \times D)) \qquad (2),$$

in which TFV is the target forecast value, ATFV is the adjusted target forecast value, FEI is the forecast error interval, D is the distance between the forecast error interval and the benchmark, and s1 and s2 are adjustable constants. It is understood that s1 and s2 can be determined according to product type, industry, customer credit, historical forecast accuracy, market trend, and others, and dynamically adjusted.

As described, the target-planning bucket may be any one of the planning buckets. If the historical forecast data corresponds to a sequence of planning buckets, such as 2003/January~2003/June, the target planning bucket may be 2003/July. If the historical forecast data corresponds to a specific planning bucket, such as 2003/January, the target-planning bucket may be 2004/January. In this case, the seasonal variation can be further removed. In the example of table 2, the 6 historical forecast data of 2003/January can be used to forecast the target forecast value of the target planning bucket 2004/January, and the 6 historical forecast data of 2003/February can be used to forecast the target forecast value of the target planning bucket 2004/February. Additionally, the target forecast value of 2004/January can be adjusted using equation (1), and the target forecast value of 2004/February adjusted using equation (2), such that the adjusted target forecast values can be improved to near the benchmark as the coming actual order in future.

Figure 4:
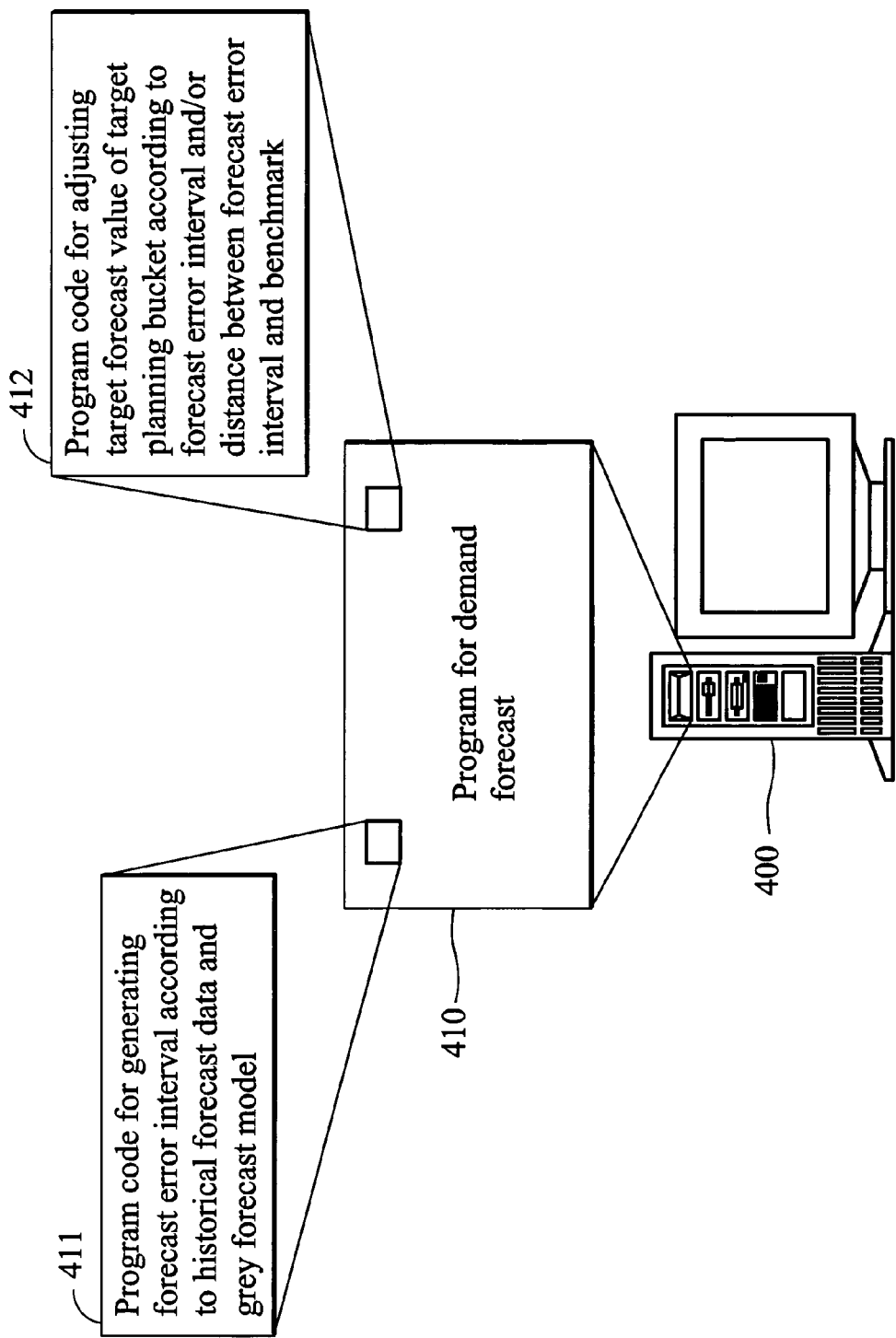
FIG. 4 is a schematic diagram illustrating a storage medium storing a computer program for execution of the demand forecast method according to an embodiment of the invention.

FIG. 4 is a diagram of a storage medium storing a computer program providing a demand forecast method according to an embodiment of the present invention. The computer program product comprises a storage medium 410 storing computer readable program codes for use in a computer system 400. The computer readable program codes comprises at least computer readable program codes 411 generating a forecast error interval according to historical forecast data and a Grey forecast model, and computer readable program codes 412 adjusting a target forecast value of a target planning bucket according to the forecast error interval and/or the distance between the forecast error interval and a benchmark. The computer readable program codes further comprise computer readable program codes normalizing the historical forecast data.

Figure 5:
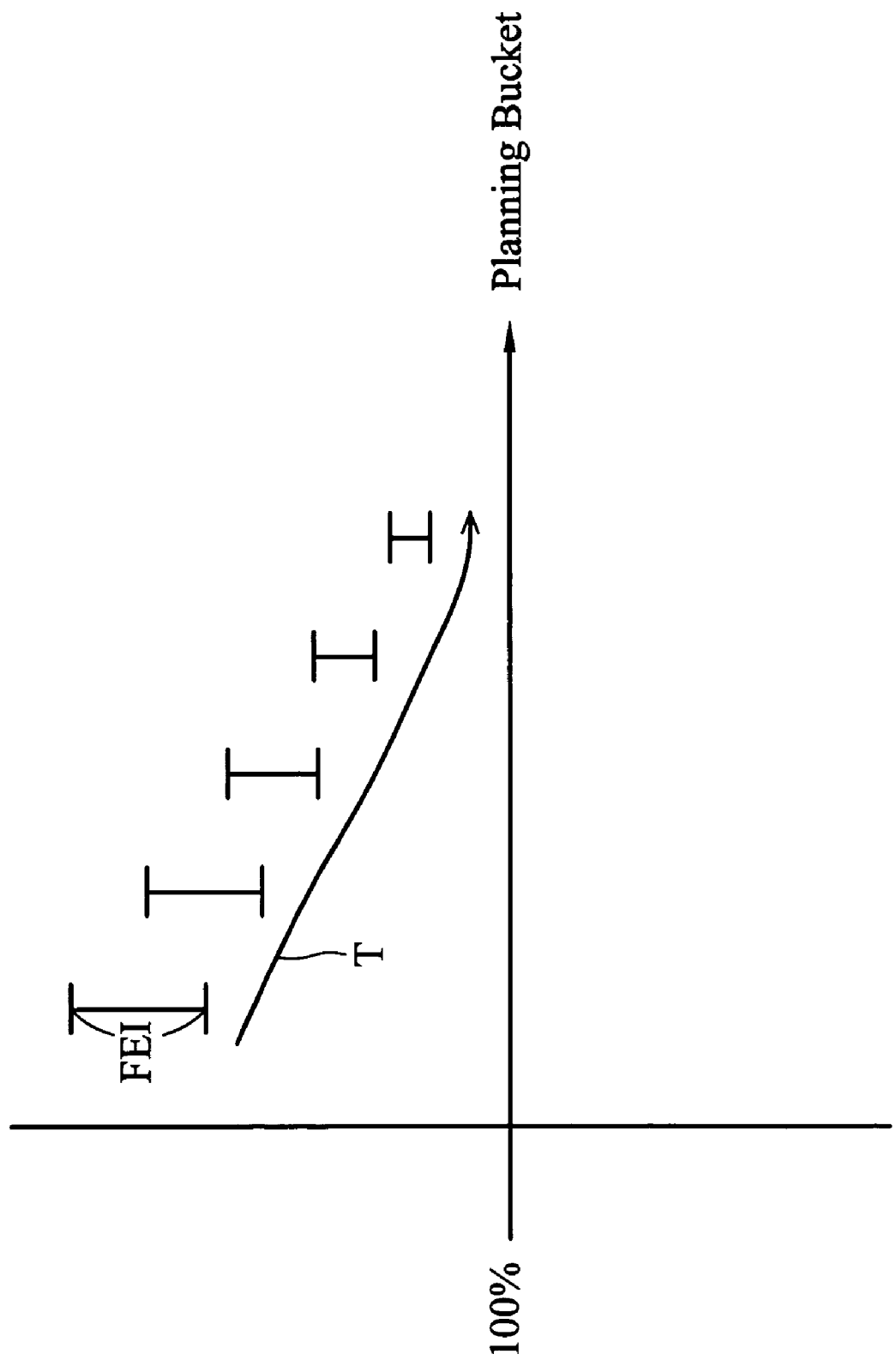
FIG. 5 is a schematic diagram illustrating the forecast trend according to an embodiment of the invention.

FIG. 5 is a schematic diagram illustrating the forecast trend according to an embodiment of the invention. As shown in FIG. 5, both the forecast error interval FET and the forecast trend T (distance) can be adjusted, such that the forecast result can be closer to actuality. It is understood that the invention can be applied to other data forecasts, such as sales, capacity, resource, material, and inventory forecasts, and others. Embodiments of the invention provide a demand forecast system and method with an adjustment mechanism based on Grey forecast model, and may thereby improve forecast flexibility, generating more accurate forecast results.

Embodiments of the method and system, or certain aspects or portions thereof, may take the form of program codes (i.e., executable instructions) embodied in tangible media, such as floppy diskettes, CD-ROMS, hard drives, or any other machine-readable storage medium, wherein, when the program codes is loaded into and executed by a machine, such as a computer, the machine thereby becomes an apparatus for practicing the embodiment. Embodiments of the method and system may also be embodied in the form of program codes transmitted over some transmission medium, such as electrical wiring or cabling, through fiber optics, or via any other form of transmission, wherein, when the program codes is received and loaded into and executed by a machine, such as a computer, the machine becomes an apparatus for practicing the embodiments. When implemented on a general-purpose processor, the program codes combines with the processor to provide a unique apparatus that operates analogously to application specific logic circuits.

Although the present invention has been described according to predefined embodiment, it is not intended to limit the invention thereto. Those skilled in this technology can still make various alterations and modifications without departing from the scope and spirit disclosed.

What is claimed is:

1. A computer-implemented demand forecast method for use in a computer, wherein the computer is programmed to perform the steps of inputting historical forecast data of a target planning bucket to a Grey forecast model to calculate two forecast values for the target planning bucket;
   forming a forecast error interval according to the two forecast values by the computer;
   adjusting a target forecast value of the target planning bucket by the computer according to a distance between the forecast error interval and a benchmark, wherein the target forecast value is adjusted according to
   ATFV=TFV×(1−(s1×FEI))×(1−(s2×D)) when the forecast error interval is above the benchmark, and is adjusted according
   to ATFV=TFV×(1+(s1×FEI))×(1+(s2×D)) when the forecast error interval is under the benchmark,
   wherein TFV is the target forecast value, ATFV is the adjusted target forecast value, FEI is the forecast error interval, D is the distance between the forecast error interval and the benchmark, s1 and s2 are adjustable constants.

2. The method of claim 1 further comprising normalizing the historical forecast data.

3. The method of claim 2 further comprising normalizing the historical forecast data based on an actual order of a specific planning bucket, in which the historical forecast data corresponds to the specific planning bucket.

4. The method of claim 1 wherein the historical forecast data corresponds to a sequence of planning buckets.

5. The method of claim 1, in which the Grey forecast model is GM(1,1) model based on Grey forecast theory.

6. The method of claim 1, wherein the demand forecast method is used to forecast a supply chain which supports material purchase, fabrication of materials into intermediate and finished products, and distribution of finished products to clients.

7. A machine-readable storage medium comprising a computer program, which, when executed, causes a computer to perform a demand forecast method, the method comprising:
inputting historical forecast data of a target planning bucket to a Grey forecast model to calculate two forecast values for the target planning bucket;
forming a forecast error interval according to the two forecast values;
adjusting a target forecast value of the target planning bucket according to a distance between the forecast error interval and a benchmark, wherein the target forecast value is adjusted according to
$ATFV=TFV \times (1-(s1 \times FEI)) \times (1-(s2 \times D))$ when the forecast error interval is above the benchmark,
wherein TFV is the target forecast value, ATFV is the adjusted target forecast value, FEI is the forecast error interval, D is the distance between the forecast error interval and the benchmark, s1 and s2 are adjustable constants, and the demand forecast method is used to forecast a supply chain which supports material purchase, fabrication of materials into intermediate and finished products, and distribution of finished products to clients.

* * * * *